United States Patent
Bengtsson

(10) Patent No.: US 8,577,877 B2
(45) Date of Patent: Nov. 5, 2013

(54) APPARATUS AND METHOD FOR SEARCHING AMONG AND PRESENTING INFORMATION ASSOCIATED WITH GEOGRAPHICAL POSITION DATA

(75) Inventor: Stefan Bengtsson, Furulund (SE)

(73) Assignee: Vodafone IP Licensing Limited, Newbury (GB)

( * ) Notice: Subject to any disclaimer, the term of this patent is extended or adjusted under 35 U.S.C. 154(b) by 923 days.

(21) Appl. No.: 12/078,599

(22) Filed: Apr. 2, 2008

(65) Prior Publication Data
US 2008/0281800 A1 Nov. 13, 2008

Related U.S. Application Data

(60) Provisional application No. 60/907,454, filed on Apr. 2, 2007.

(51) Int. Cl.
*G06F 17/00* (2006.01)
(52) U.S. Cl.
USPC .......................................................... 707/724
(58) Field of Classification Search
USPC ........................... 707/724, 708, 736, 999.003
See application file for complete search history.

(56) References Cited

U.S. PATENT DOCUMENTS

| 5,930,474 | A  | * | 7/1999 | Dunworth et al. | ............ 709/217 |
| 6,523,028 | B1 |   | 2/2003 | DiDomizio et al. | |
| 6,772,213 | B2 | * | 8/2004 | Glorikian | ...................... 709/228 |
| 7,076,505 | B2 | * | 7/2006 | Campbell | ............................. 1/1 |
| 7,082,365 | B2 |   | 7/2006 | Sheha et al. | |
| 2002/0013815 | A1 |   | 1/2002 | Obradovich et al. | |
| 2002/0042819 | A1 | * | 4/2002 | Reichert et al. | ............... 709/217 |
| 2003/0036848 | A1 |   | 2/2003 | Sheha et al. | |
| 2004/0158389 | A1 | * | 8/2004 | Shibata et al. | ................ 701/200 |
| 2005/0108213 | A1 | * | 5/2005 | Riise et al. | ......................... 707/3 |
| 2005/0154730 | A1 | * | 7/2005 | Miller et al. | ....................... 707/9 |
| 2006/0235816 | A1 |   | 10/2006 | Yang et al. | |
| 2006/0253247 | A1 |   | 11/2006 | De Silva et al. | |
| 2008/0016472 | A1 | * | 1/2008 | Rohlf et al. | ................... 715/848 |
| 2008/0077559 | A1 | * | 3/2008 | Currie et al. | ...................... 707/3 |
| 2008/0270366 | A1 | * | 10/2008 | Frank | ................................ 707/3 |

FOREIGN PATENT DOCUMENTS

EP 1148745 4/2001

OTHER PUBLICATIONS

European Search Report

* cited by examiner

*Primary Examiner* — Mohammed R Uddin
(74) *Attorney, Agent, or Firm* — Harness, Dickey & Pierce, P.L.C.

(57) ABSTRACT

Example embodiments relate to an apparatus for searching and presenting information associated with geographical position data. The apparatus includes an input device including a user interface. The user interface includes at least a first input text box configured to receive a first text item, wherein said first text item is a general search text item, at least a second input text box configured to receive a second text item, wherein said second text item is a geographical position text item, and a user actuation input device. The apparatus further includes a database selection engine and a database search engine configured to perform a database search based on said at least first and second text input, and an output device configured to present information associated with geographical position data based upon data retrieved from a database selection engine or a database search engine.

36 Claims, 6 Drawing Sheets

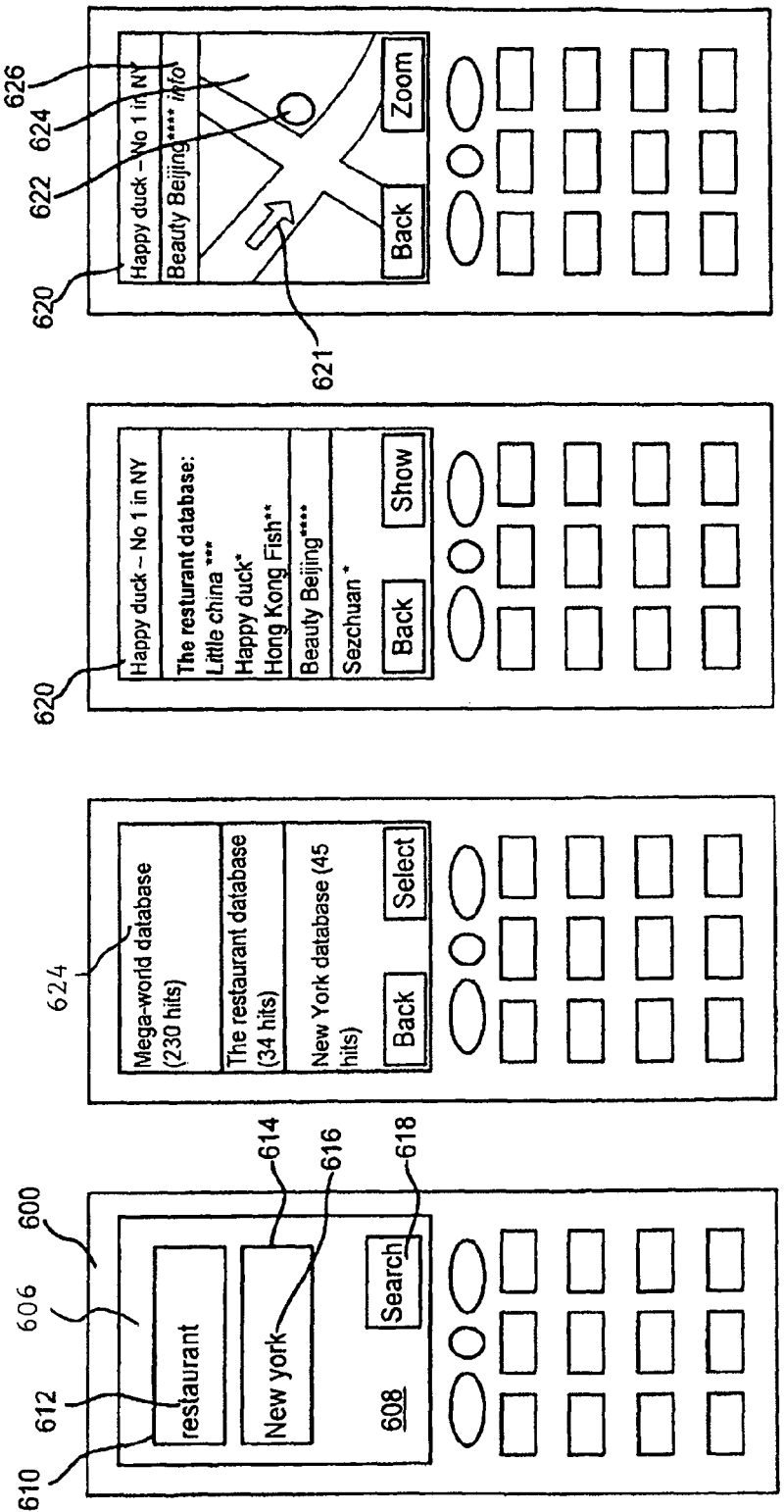

ated with geographical position data, as well as a system and a method.

APPARATUS AND METHOD FOR SEARCHING AMONG AND PRESENTING INFORMATION ASSOCIATED WITH GEOGRAPHICAL POSITION DATA

This application claims the priority of U.S. Provisional Patent Application No. 60/907,454, filed Apr. 2, 2007, in the United States Patent and Trademark Office, the disclosure of which is incorporated herein in its entirety by reference.

TECHNICAL FIELD

The present invention generally relates to an apparatus for searching among and presenting geographical position data, as well as a system and a method.

BACKGROUND OF THE INVENTION

Today, there are a number of different approaches to search among and present information associated with geographical position data.

A geographic position can be described in many different ways, e.g. address, name of business, phone number or name of a person. After the position has been identified on the map it can be used for different purposes, e.g. present it on a map, use it as origin, or destination.

The solutions known from prior art all have the approach that the user first decides what to search for and then the system searches in a particular database.

It is sometimes hard to know what databases that will get the matches, using the current approach.

An example of such a system is presented in US-2006/0235816, which describes a method for searching in databases, where known information about a user position is used to locally adapt a search.

Another example of a system for searching and presenting geographical position data is disclosed in U.S. Pat. No. 6,523,028, which describes a method for step by step refining a database search through the system to propose suitable search words and databases to search in, in order to let the user on basis of the search result further refine the search.

A further example of a system for searching and presenting geographical position data is disclosed in U.S. Pat. No. 7,082,365, which describes a plurality of methods for searching various points of interest within a given search zone, such as radial search, boxed boundary search, or a zip code or city search, based on position information from a navigational device. The method incorporates a categorical rating metrics search engine for providing the searcher with an indexed response of the highest rated points of interest within the spatial search zone based on the user's search criteria.

A further example of a system for searching and presenting information associated with geographical position data is disclosed in US 2006/253247 A1.

However, although there are a number of solutions for searching among and presenting geographical position data there is no prior art dealing with the problem of having information in a plurality of databases.

SUMMARY OF THE INVENTION

In view of the above, an objective of the invention is to solve or at least reduce the problems discussed above. In particular, an objective is to provide an apparatus for searching among and presenting information associated with geographical position data.

The above object is achieved according to a first aspect of the invention by an apparatus for searching among and presenting information associated with geographical position data, said apparatus comprising:

a GPS receiver adapted to receive geographical position data, an input device comprising a user interface comprising at least a first input text box adapted to receive a first text item, wherein said first text item is a general search text item, at least a second input text box adapted to receive a second text item, wherein said second text item is a geographical position text item, and a user actuation input device, said apparatus further comprises a database selection engine adapted to select a number of databases from a plurality of databases, a database search engine adapted to perform a database search in said number of databases based upon said first and second text item, upon reception of a user input actuation, via said user actuation input device, an output device adapted to present information associated with geographical position data based upon data retrieved from a database search engine.

Hence, the invention facilitates the searching and presentation of information associated with geographical position data.

Further, the first input field may comprise a first text box and the first search input item may comprise a first search text item.

Further, the second input field may comprise a second text box and the second search input item may comprise a second search text item.

Further, the apparatus may comprise an advertisement engine configured to add advertisement data to said information associated with geographical position data.

An advantage of this is that it is possible to add specific and relevant information available for the user.

Further, the database search engine may be configured as a client-based database search engine.

An advantage of this is that the computational power is associated with the apparatus, which in turn, implies that the functionality is less dependent on the number of apparatuses using the databases.

Further, the database search engine may be configured as a server-based database search engine.

An advantage of this is that less computational power is needed by the apparatus.

Further, the database selection engine may be configured as a client-based database selection engine.

An advantage of this is that the computational power is associated with the apparatus, which in turn, implies that the functionality is less dependent on the number of apparatuses using the databases.

Further, the database selection engine may be configured as a server-based database selection engine.

An advantage of this is that less computational power is needed by the apparatus.

Further, the output device may be configured as a separate output device connected to said apparatus, via a wireless transmission.

An advantage of this is that the output device could be placed in a convenient place for the user, e.g. if using the apparatus in a car a fixed display mounted on the dashboard may be connected to the apparatus.

Further, the second input text item may be configured to be automatically retrieved from said GPS receiver.

In this way a more time efficient way for searching among and presenting information associated with geographical position data, is achieved.

Further, the plurality of databases may be remote or local databases or a combination thereof.

An advantage of this is increased customisation capabilities, e.g. a local contact database as well as an internet-based contact database may be searched simultaneously.

Further, the first text item may be selected from a group consisting of a name, an address and a business category.

Further, the database selection engine may be based upon geographical position data, and the geographical position data may be selected from a group consisting of country, user profile capabilities, user profile preferences and user profile accesses.

Further, the second text item may be manually entered geographical position data.

An advantage of this is enablement of manual search for information associated with geographical position data.

Further, the output device may be adapted to present said geographical position data in a categorised manner.

An advantage of this is that it is easier for the user to see where the results originate from and thereby easier to select the category that most likely contains the results the user looked for.

Further, the apparatus may have a database subscription module providing database user specific subscription information.

Further, the number of databases may be manually selected.

An advantage of this is that the user may perform specific searches.

The above object is achieved according to a second aspect of the invention by a method for searching and presenting information associated with geographical position data using an apparatus, said method comprising the steps of:

generating a search profile from a first and a second text item, wherein said first text item is a general search text item and said second text item is a geographical position text item, selecting a number of databases from a plurality of databases, performing an overall search in said number of databases based upon said search profile, presenting said overall search result based upon data retrieved from said number of databases, receiving a user input actuation corresponding to at least one of said number of databases, performing a detailed database search, in said at least one of said number of databases, and presenting said detailed database search.

The method according to the second aspect may further comprise adding advertisement data to said information associated with geographical position data by using an advertisement data engine.

The method according to the second aspect may further comprise searching information associated with geographical position data by using a client-based database search engine.

The method according to the second aspect may further comprise searching information associated with geographical position data by using a server-based database search engine.

The method according to the second aspect may further comprise selecting information associated with geographical position data by using a client-based database selection engine.

The method according to the second aspect may further comprise selecting information associated with geographical position data by using a server-based database selection engine.

The method according to the second aspect may further comprise separating said output device to said apparatus by using a separate output device connected to said apparatus, via a wireless transmission.

The method according to the second aspect may further comprise automatically retrieving said second input text item by using a GPS receiver.

The method according to the second aspect may further comprise remotely or locally placing said plurality of databases by using remote or local databases or a combination thereof.

The method according to the second aspect may further comprise selecting said first text item from a group consisting of name, an address and a business category.

The method according to the second aspect may further comprise basing said database selection engine upon geographical position data, and selecting said geographical position data from a group consisting of country, user profile preferences and user profile accesses.

The method according to the second aspect may further comprise manually entering said second text item as geographical position data.

The method according to the second aspect may further comprise adapting said output device for presenting said geographical position data in a categorised manner.

The method according to the second aspect may further comprise subscribing for a certain selection of databases.

The method according to the second aspect may further comprise manually selecting said number of databases.

Advantages of the first aspect are also applicable for this second aspect.

The above object is achieved according to a third aspect of the invention by a system for searching and presenting information associated with geographical position data, said apparatus comprising:

a communications network, an apparatus according to the invention connected to said communications network, and a plurality of databases connected to said communications network.

Advantages of the first aspect are also applicable for this second aspect.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals have been used for similar elements, wherein:

FIGS. 6a-6d illustrate an example of an embodiment of the present invention.

DETAILED DESCRIPTION OF PREFERRED EMBODIMENTS

Figure 1:
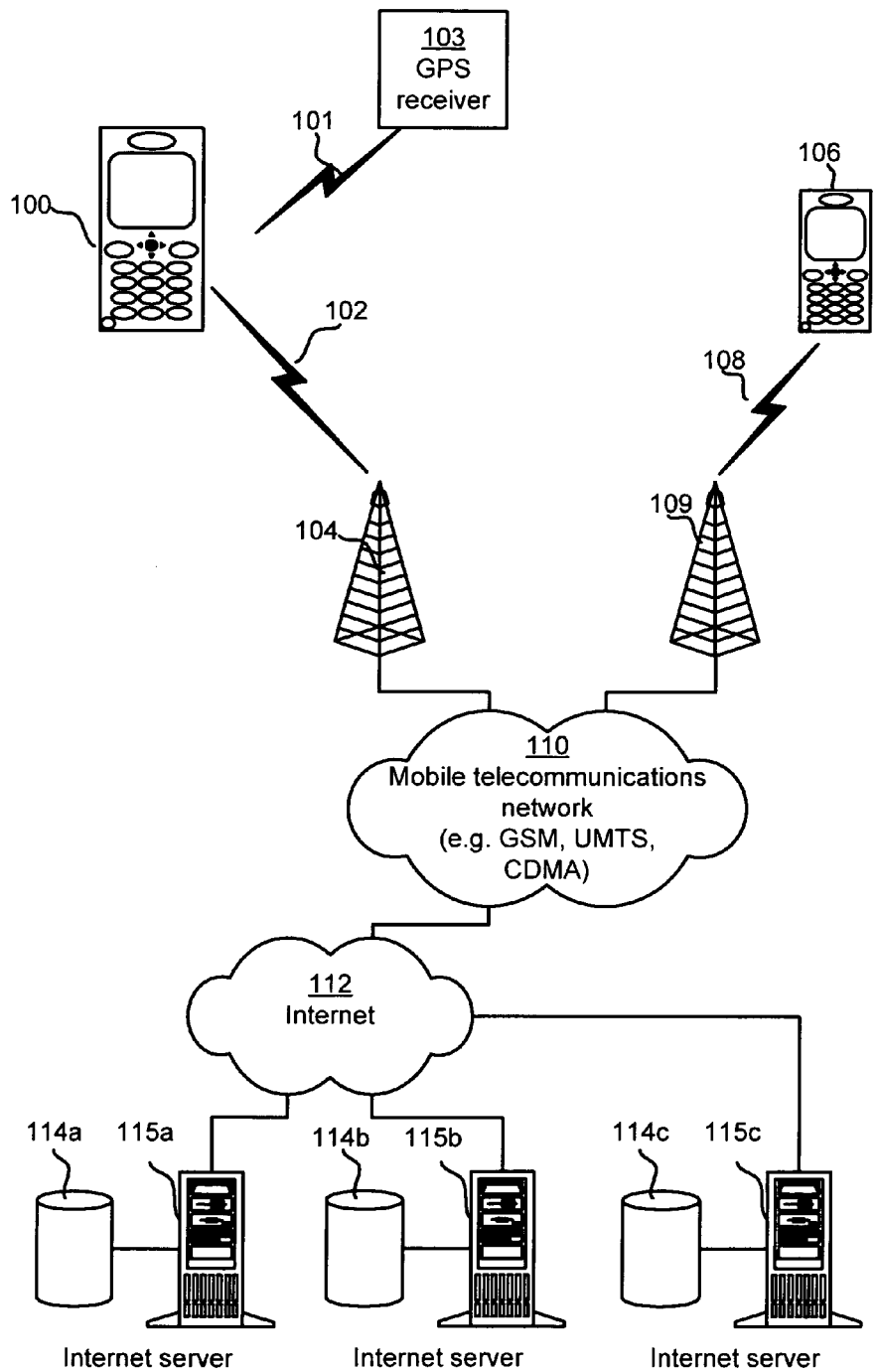
FIG. 1 is a schematic illustration of a system for searching among and presenting information associated with geographical position data.

FIG. 1 generally illustrates a system for searching among and presenting information associated with geographical position data. The system comprises an apparatus 100 that may communicate wirelessly 101 with an external GPS receiver 103 and may communicate wirelessly 102 via a base station 104, connected to, e.g., a communication network 110 (GSM, UTMS, CDMA), which further via internet 112, connects to a plurality of internet servers 115 a-c and databases 114 a-c.

Alternatively the apparatus 100 may be provided with an internal GPS receiver 106 that may communicate wirelessly 108 with a base station 109.

Figure 2:
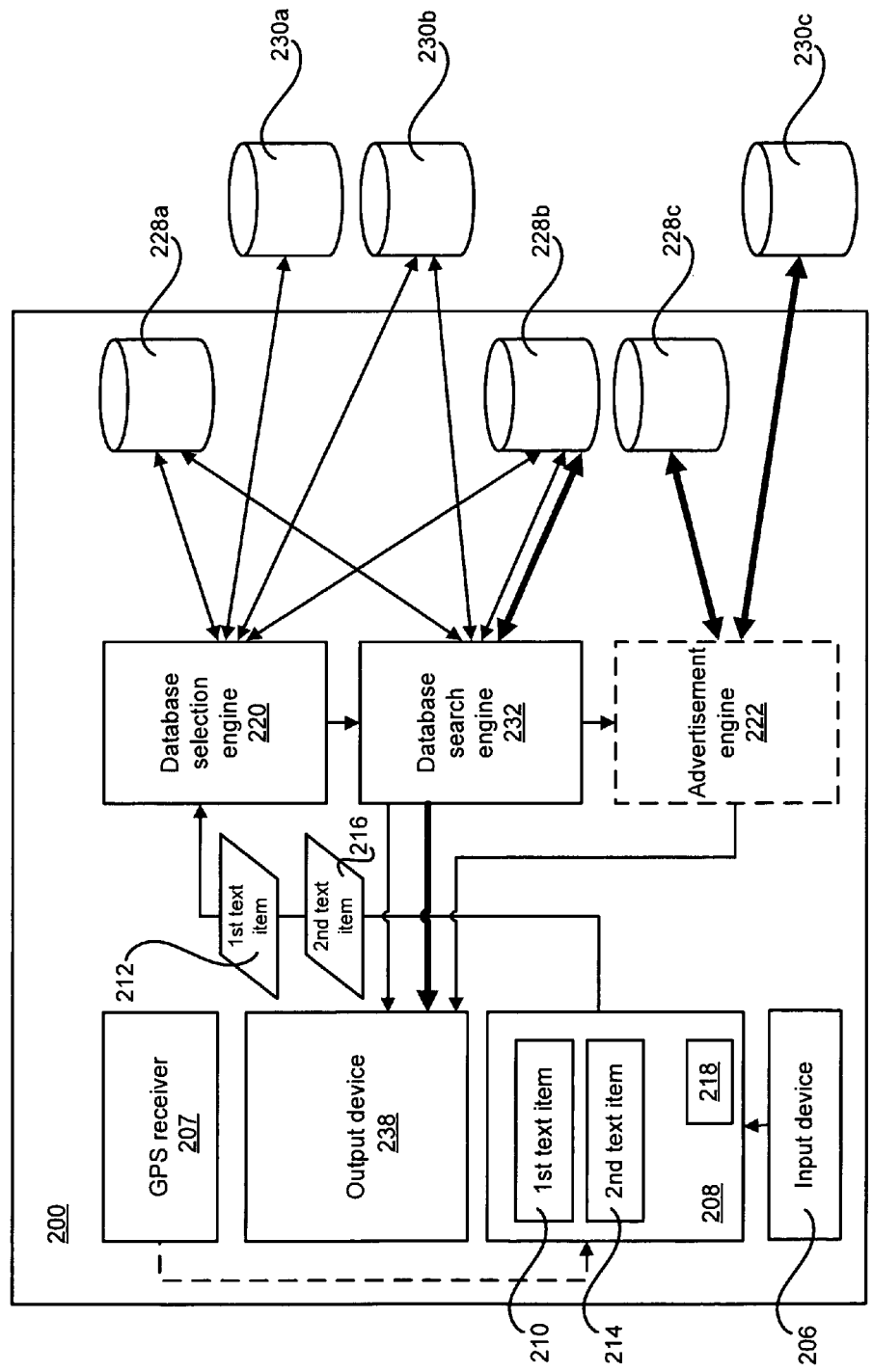
FIG. 2 schematically illustrates an embodiment of the apparatus with a client-based database search engine and a client-based database search engine.

FIG. 2 schematically illustrates a server-based apparatus. The apparatus 200 may be provided with an input device 206 having a user interface 208, which may be a graphical user interface that has a first input text box 210 adapted to receive a first text item 212 and a second input text box 214 adapted to receive a second text item 216.

The first text item 212 is a general search text item used for defining what to search for, e.g. name of a person, an address, business category or similar. Possible entries are text, figures, symbols or a combination.

The second text item 216 is optional and can be entered manually or automatically by an external GPS receiver (not shown) or by an internal GPS receiver 207. The second text item 216 may be used to specify a geographical region via city name, country, municipality, zip code or similar.

The apparatus 200 may further be provided with a user actuation input device 218, such as a graphical display button adapted to generate a search and presentation of information associated with geographical position data, based upon the first text item 212 and optionally the second text item 216.

Alternatively of entering a first text item a voice input device may be used for defining what to search for and alternatively of entering a second text item a voice input device may be used to specify a geographical region.

Further, the apparatus may comprise a client-based database selection engine 220. The database selection engine 220 selects a number of databases from a plurality of databases, based upon the first text item 212 and optionally the second text item 216. The database selection may also select databases based upon geographical location, desired country, user profile capabilities, user profile preferences and what databases a particular user has access to. The plurality of databases may consist of either local databases 228 a-b in the apparatus 200, remote databases 230 a-b or a combination thereof.

Moreover, the apparatus 200 may comprise a client-based database search engine 232, adapted to perform a database search in the databases selected by the database selection engine 220 based upon the first text item 212 and optionally the second text item 216. Alternatively, the database search may be based upon a manual selection of databases.

Further, the apparatus 200 may be provided with an advertisement engine 222 configured to add advertisement data from either a local database 228 c or from a remote database 230 c to the information associated with geographical position data.

Further, the apparatus 200 may have an output device 238 that has a display adapted to present information associated with geographical position data. The output device 238 may be placed internally within the apparatus 200 or externally.

Figure 3:
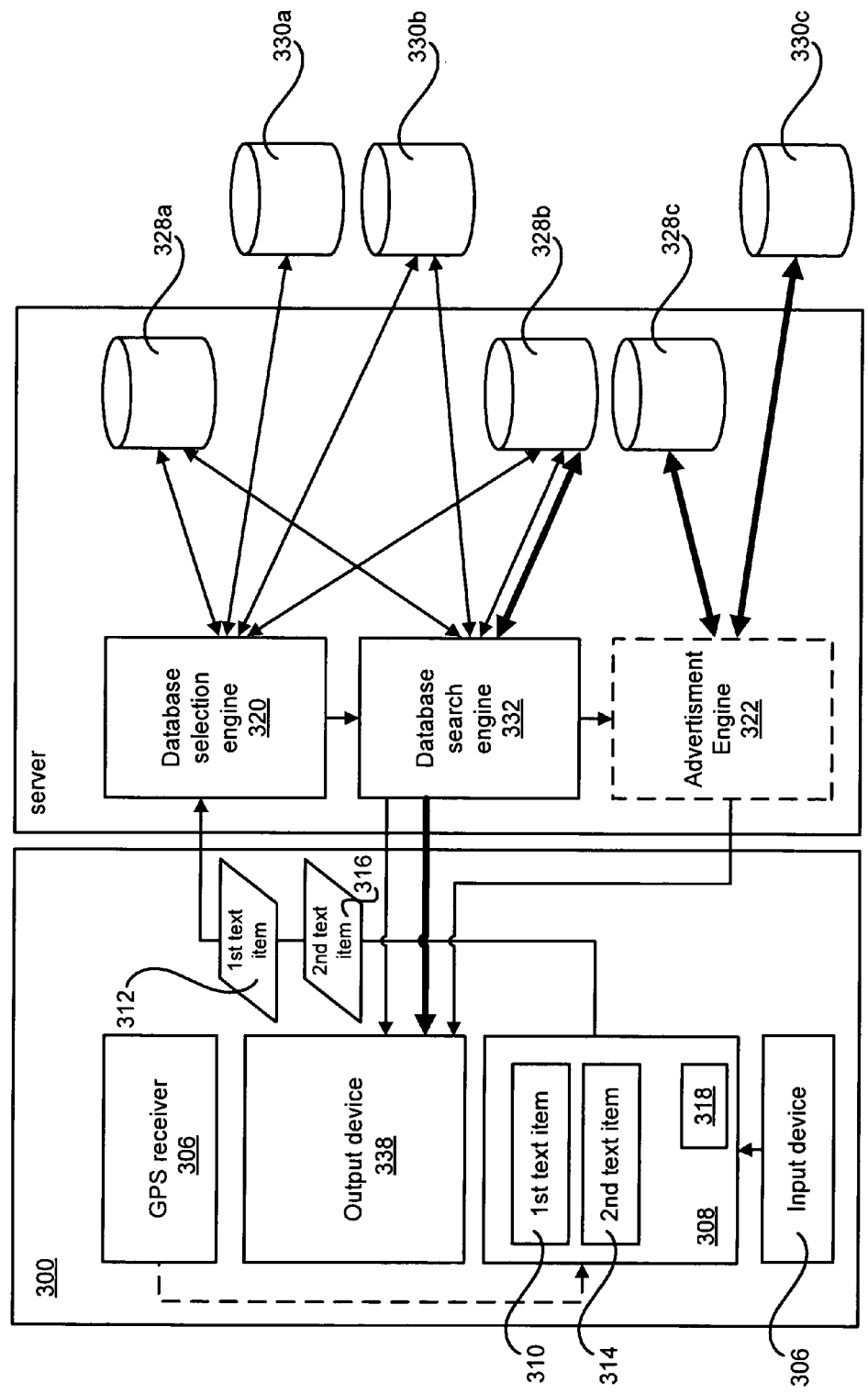
FIG. 3 schematically illustrates the apparatus of FIG. 1 in further detail, with a server-based database selection engine, and a server-based database search engine.

FIG. 3 schematically illustrates an apparatus 300 of FIG. 1 in further detail. As in FIG. 2, the apparatus 300 may be provided with a GPS receiver 306, an input device 306, a graphical user interface 308 that has a first input text box 310 adapted to receive a first text item 312 and a second input text box 314 adapted to receive a second text item 316 and further a user actuation input device 318, such as a graphical display button, to generate a search and presentation of information associated with geographical position data, based upon the first text item 312 and optionally the second text item 316.

Further, the apparatus 300 may comprise a server-based database selection engine 320, which means that the database selection engine is placed on a server. The database selection engine 320 selects a number of databases from a plurality of databases, based upon the first text item 312 and optionally the second text item 316. The database selection may also select databases based upon geographical location, desired country, user profile capabilities, user profile preferences and what databases a particular user has access to. The plurality of databases may consist of either local databases 328 a-b in the apparatus 300, remote databases 330 a-b or a combination thereof.

Moreover, the apparatus 300 may comprise a server-based database search engine 332, adapted to perform a database search in the databases selected by the database selection engine 320 based upon the first text item 312 and optionally the second text item 316. Alternatively, the database search may be based upon a manual selection of databases.

Further, the apparatus 300 may be provided with an advertisement engine 322 configured to add advertisement data from either a local database 328 c or from a remote database 330 c to the information associated with geographical position data.

Further, the apparatus 300 may have an output device 338 that has a display adapted to present information associated with geographical position data. The output device 338 may be placed externally from the apparatus 300 as illustrated in FIG. 3.

Figure 4:
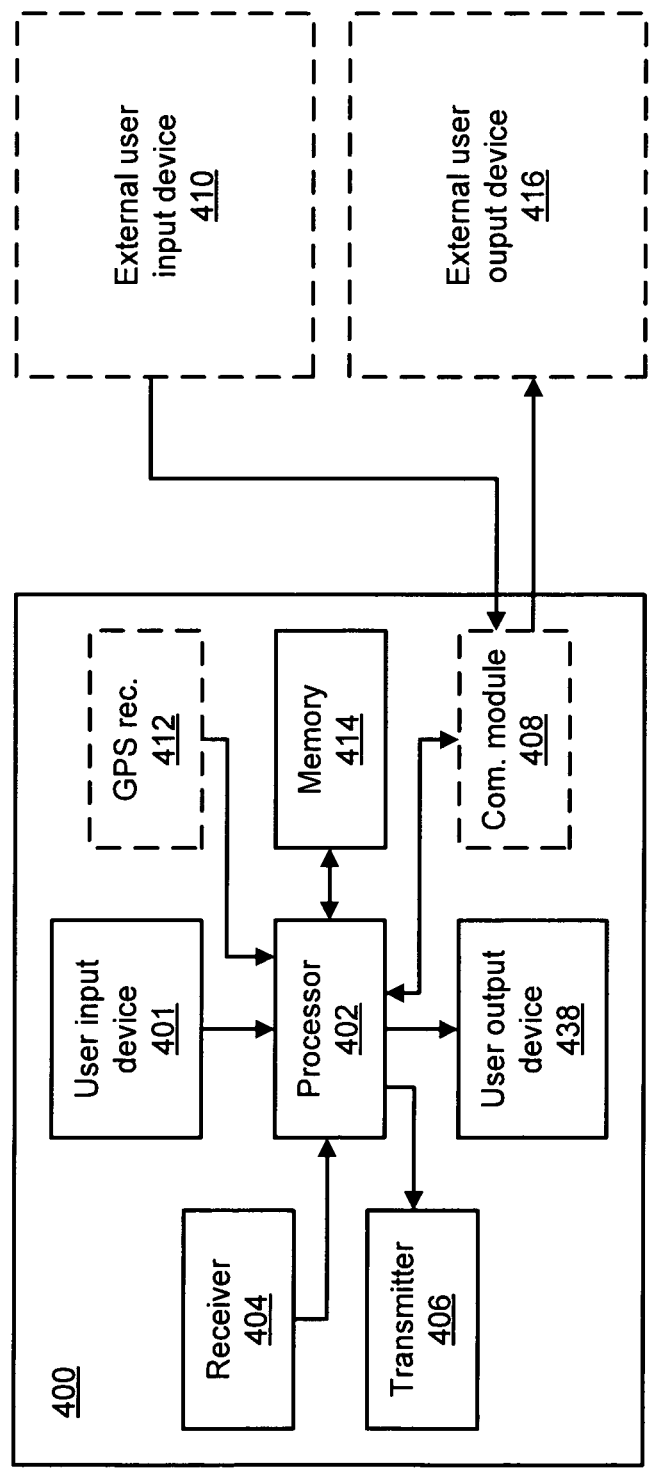
FIG. 4 is a diagrammatic illustration of an apparatus for searching among and presenting information associated with geographical position data.

FIG. 4 is a diagrammatic illustration of an apparatus 400 for searching among and presenting information associated with geographical position data. The apparatus 400 may be provided with a user input device 401 that has a user interface, which may be a graphical user interface, preferably with a user actuation input device, used in order to generate a search profile, which is then transmitted to a processor 402. The processor 402 can receive information associated with geographical position data, and other data, through a receiver 404 and send information associated with geographical position data, and other data, through a transmitter 406. Further, the apparatus may communicate via a communication module 408, e.g. a bluetooth device, infra-red link or similar, with an external user input device 410 and with an external user output device 416. The processor 402 may also be adapted to communicate with an internal user input device 401. In one preferred embodiment of the present invention an external GPS receiver 412 is connected to receive geographical position data to the processor 402.

The processor 402 is adapted to communicate with a memory 414, where the information associated with geographical information, and other data, is stored.

Further, the apparatus 400 may have an output device 438 that may comprise a display, loudspeaker or similar adapted to present information associated with geographical position data. The output device 438 may be placed internally within the apparatus 400 as illustrated in FIG. 4.

Figure 5:
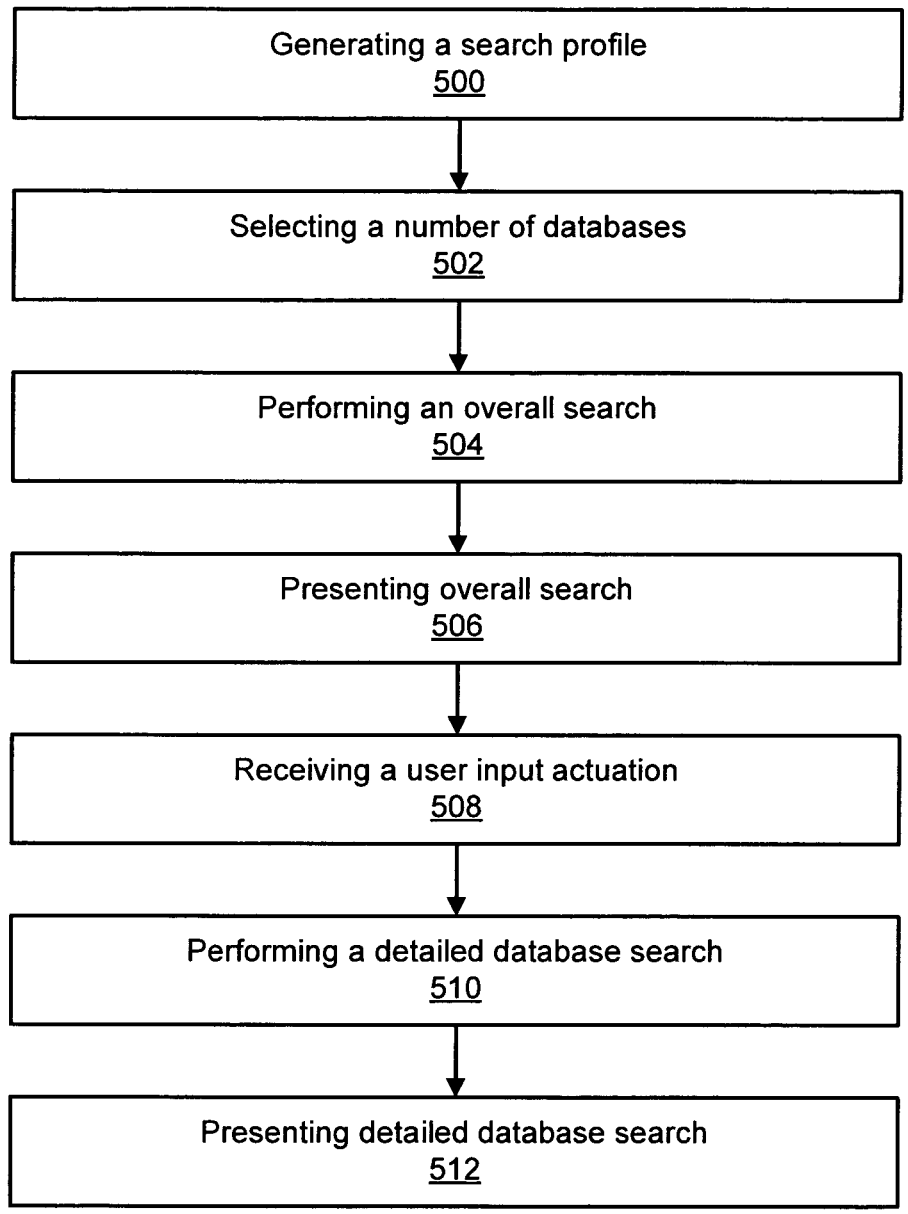
FIG. 5 generally illustrates a method for searching among and presenting information associated with geographical position data.

FIG. 5 generally illustrates a method according to the present invention.

In a first step 500, a search profile is generated from a first text item, e.g. a name and optionally a second text item, e.g. a city.

In a second step 502, a number of databases are selected from a plurality of databases based upon the first text item and optionally the second text item.

In a third step 504, an overall search is performed in the number of databases selected from a plurality of databases based upon the search profile.

In a fourth step 506, an overall search result is presented, preferably via an output device that may comprise a display, a load speaker or similar.

In a fifth step 508, a user input actuation that corresponds to at least one of the databases selected from a plurality of databases is received.

In a sixth step 510, a detailed database search in at least one of the databases selected from a plurality of databases is performed.

In a seventh step 512 a detailed database search can be presented.

The wording of performing an overall search and the wording of performing a detailed search are to be interpreted widely.

For example, a thorough database search can be performed in association to the overall search. A part of the thorough database search may be displayed to the user in association to the presentation of the overall database search result. This part may e.g. comprise the number of hits and the most relevant hits, such as the three most relevant hits. After a user input actuation is received, the rest of the thorough database search, or part of the rest of the thorough database search, may be utilised to present the detailed search result. The thorough database search result may be stored internally, i.e. in the client device, or externally, e.g. on a dedicated place on a server.

In another example, an overall search can be performed in a number of databases and then a new database search can be performed in the selected databases. In other words, two separate database searches are performed.

In yet anther example, the approach of performing a thorough database search at an early stage of the process and the approach of performing successive database search during the process may be combined. For instance, the thorough database search may contain a number of most relevant hits for the databases, which means that the thorough database search may be enough in most of the searches. However, if the user requests more hits than the ones comprised in the result of the thorough database search new database searches will be executed.

No matter how the search process is structured, the user will perceive the situation as a first search phase in which an overall search is presented, a phase where the user inputs his database preferences, and a second search phase in which a detailed search is presented.

FIGS. 6a-6d illustrates an example of an embodiment of the present invention.

FIG. 6a illustrates an example of an embodiment of the present invention where the input device 606 has a graphical user interface 608 that has a first input text box 610 that shows a first text item 612, in this example "restaurant" and a second input text box 614 that shows a second text item 616, in this example "New York".

As illustrated in FIG. 6a, the apparatus 600 is further provided with a user actuation input device 618, to generate a search and presentation of information related associated with geographical position data.

FIG. 6b illustrates an example of an embodiment of the present invention where the database selection engine (not showed) selects a number of databases from a plurality of databases (not showed), based upon the first text item 612, "restaurant" and the second text item 616, "New York". As illustrated in FIG. 6b, the databases selected by the database selection engine are presented in the user output device 624, in this example a display as "Mega-world database (230 hits)", "The restaurant database (34 hits)" and "New York database (45 hits)" are presented. The selection of databases is based upon geographical location, desired country, user profile capabilities, user profile preferences and what databases a particular user has access to. In this example the user chooses to search in "The restaurant database (34 hits)".

Based on the example as illustrated in FIG. 6b, FIG. 6c illustrates an example of an embodiment of the present invention where the user has generated a detailed search and presentation of information associated with geographical position data, in this example named "The restaurant database" by the user actuation input device 618. As illustrated in the graphical user interface 608, in this example a display, the detailed search revealed "Little china***", "Happy duck*", "Hong Kong Fish", "Beauty Beijing**" and "Sezchuan*", where the user has marked "Beauty Beijing****" for selection. In this example there is, in the top of the display an advertisement named "Happy duck—No 1 in NY", which has been selected by an advertisement engine, based upon user specific preferences such as interests, or geographic location.

FIG. 6d illustrates an example of an embodiment of the present invention where the detailed search result is presented in the graphical user interface 608, in this example a display, where the user geographically can orient himself to the destination guided by, in this example an arrow 621 directed towards the destination, marked with a ring 622 in the map illustrated on the display 624. Also in this example an advertisement 620 is added in the top of the display together with information about the selected destination 626.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A method, using an apparatus, of searching and presenting information associated with geographical position data, said method comprising:
  generating a search profile from a first and a second input item, wherein said first input item is a general search input item and said second input item is a geographical position input item,
  selecting at least two databases from a plurality of databases based on said search profile,
  performing an overall search in said at least two selected databases based on said search profile, displaying results of the overall search of said at least two databases, the results including first information identifying a first one of the at least two selected databases and second information identifying a second one of the at least two selected data bases, the first information and second information simultaneously displayed, the first information displayed with third information providing an indication of a number of hits produced by the overall search of the first one of the at least two selected databases, and the second information displayed with fourth information providing an indication of a number of hits produced by the overall search of the second one of the at least two selected databases, selecting said geographical position data from a group consisting of country, user profile preferences and user profile accesses, the geographical position data being selected using a database selection engine, receiving a user input actuation selecting the first one of the at least two selected databases or the second one of the at least two databases based on the displayed first information, second information, third information, and fourth information, performing a detailed database search in the first one or the second one of the at least two databases selected based on the user input actuation, and displaying results of said detailed database search, the displayed results of the detailed database search corresponding to all or a portion of the hits produced by the overall search for the first one or the second one of the at least two databases selected based on the user input actuation.

2. The method according to claim 1, further comprising displaying advertisement data with the results of at least one of the overall search or the detailed database search, the advertisement data associated with geographical position data corresponding to the search profile.

3. The method according to claim 1, further comprising searching information associated with geographical position data by using a client-based database search engine.

4. The method according to claim 1, further comprising searching information associated with geographical position data by using a server-based database search engine.

5. The method according to claim 1, further comprising selecting information associated with geographical position data by using a client-based database selection engine.

6. The method according to claim 1, further comprising selecting information associated with geographical position data by using a server-based database selection engine.

7. The method according to claim 1, further comprising separating an output device from said apparatus by using a separate output device connected to said apparatus via a wireless transmission.

8. The method according to claim 1, further comprising automatically retrieving said second input item using a GPS receiver.

9. The method according to claim 1, wherein the at least two selected databases are remote or local databases relative to geographical position input item.

10. The method according to claim 1, further comprising selecting said first input item from a group consisting of name, an address and a business category.

11. The method according to claim 1, further comprising manually entering said second input item as geographical position data.

12. The method according to claim 1, further comprising configuring an output device to display said geographical position data in a categorised manner.

13. The method according to claim 1, wherein the plurality of databases include subscription databases.

14. The method according to claim 1, further comprising manually selecting said at least two databases.

15. The method according to claim 1, wherein said results of the detailed database search includes information corresponding to geographical position data based on data retrieved from said at least one of the two selected databases.

16. The method according to claim 1, wherein
the plurality of databases are pre-selected based on preferences of a user included in stored user profile information, and
at least two selected databases are selected from the plurality of databases pre-selected based on the user preferences.

17. The method according to claim 1, wherein the first and third information is displayed in a region of a display screen separate from a region of the display screen including the second and fourth information.

18. An apparatus for searching and presenting information associated with geographical position data, said apparatus comprising:
a GPS receiver connected to a processor and adapted to receive geographical position data;
an input device connected to the processor and configured to generate a search profile, the input device including
a user interface including at least a first input field and a second input field, the first input field configured to receive a first input item and the second input field configured to receive a second input item, wherein said first input item is a general search input item and said second input item is a geographical position input item, and
a user actuation input device;
a database selection engine configured to select at least two databases from a plurality of databases based on said first and second input items;
a database search engine configured to perform an overall database search in said at least two selected databases based on said first and second input items, and a detailed database search in a selected one of said at least two selected databases based on said search profile and a user input actuation received via said user actuation input device;
an output device configured to display results of the overall database search and the detailed database search, wherein
the displayed results of the overall database search include first information identifying a first one of the at least two selected databases and second information identifying a second one of the at least two selected data bases, the first and second information simultaneously displayed, the first information displayed with third information providing an indication of a number of hits produced by the overall search of the first one of the at least two selected databases, and the second information displayed with fourth information providing an indication of a number of hits produced by the overall search of the second one of the at least two selected databases,
wherein said database selection engine is based on geographical position data, and wherein said geographical position data is selected from a group consisting of country, user profile capabilities, user profile preferences and user profile accesses, the database search engine selects said one of the at least two selected databases to perform the detailed database search based on the user input activation received through the user input activation device, and the displayed results of the detailed database search corresponds to all or a portion of the hits produced by the overall search for the first one or the second one of the at least two databases selected based on the user input actuation.

19. The apparatus according to claim 18, wherein said first input field includes a first text box and first input item includes a first search text item.

20. The apparatus according to claim 18, wherein said second input field includes a second text box and second input item includes a second search text item.

21. The apparatus according to claim 18, further comprising an advertisement engine configured to add advertisement data to at least one of the displayed results of the overall database search or the detailed database search.

22. The apparatus according to claim 18, wherein said database search engine is a client-based database search engine.

23. The apparatus according to claim 18, wherein said database search engine is a server-based database search engine.

24. The apparatus according to claim 18, wherein said database selection engine is a client-based database selection engine.

25. The apparatus according to claim 18, wherein said database selection engine is a server-based database selection engine.

26. The apparatus according to claim 18, wherein said output device is an output device separately connected to said apparatus via a wireless transmission.

27. The apparatus according to claim 18, wherein said second input item is automatically retrieved from said GPS receiver.

28. The apparatus according to claim 18, wherein said plurality of databases are remote or local databases.

29. The apparatus according to claim 18, wherein said first input item is selected from a group consisting of a name, an address and a business category.

30. The apparatus according to claim 18, wherein said second input item is a manually entered geographical position data.

31. The apparatus according to claim 18, wherein said output device is configured to display said geographical position data in a categorised manner.

32. The apparatus according to claim 18, further comprising a database subscription module including a database of user specific subscription information.

33. The apparatus according to claim 18, wherein said at least two databases are manually selected.

34. The apparatus according to claim 18, wherein said output device is further configured to display the results of the detailed database search with information corresponding to geographical position data based on data retrieved from said at least one of the two selected databases.

35. A system for searching and presenting information associated with geographical position data, said system comprising:

a communications network, an apparatus connected to said communications network, said apparatus including:

a GPS receiver connected to a processor and adapted to receive the geographical position data;

an input device connected to the processor and configured to generate a search profile, the input device including a user interface including at least a first input field and a second input field, the first input field configured to receive a first input item and the second input field configured to receive a second input item, wherein said first input item is a general search input item and said second input item is a geographical position input item, and a user actuation input device;

a database selection engine configured to select at least two databases from a plurality of databases based on said first and second input item;

a database search engine configured to perform an overall database search in said at least two selected databases based on said first and second input items, and a detailed database search in a selected one of said at least two selected databases based on said search profile and a user input actuation received via said user actuation input device; and an output device configured to display results of the overall database search and the detailed database search wherein the plurality of databases are connected to said communications network, and the displayed results of the overall database search include:

first information identifying a first one of the at least two selected databases and second information identifying a second one of the at least two selected databases, the first and second information simultaneously displayed, the first information displayed with third information providing an indication of a number of hits produced by the overall search of the first one of the at least two selected databases, and the second information displayed with fourth information providing an indication of a number of hits produced by the overall search of the second one of the at least two selected databases, wherein said database selection engine is based on geographical position data, and wherein said geographical position data is selected from a group consisting of country, user profile capabilities, user profile preferences and user profile accesses.

36. The apparatus according to claim 35, wherein said output device is further configured to display the results of the detailed database search with information corresponding to geographical position data based on data retrieved from said at least one of the two selected databases.

* * * * *